May 17, 1938.  D. H. ROW  2,117,770
CONTACT GLASS CONSTRUCTION
Filed May 29, 1936
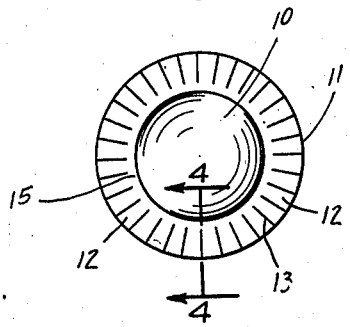
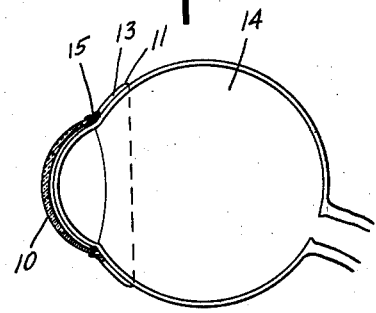
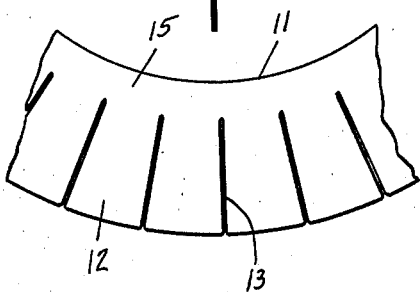
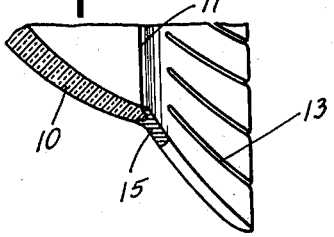
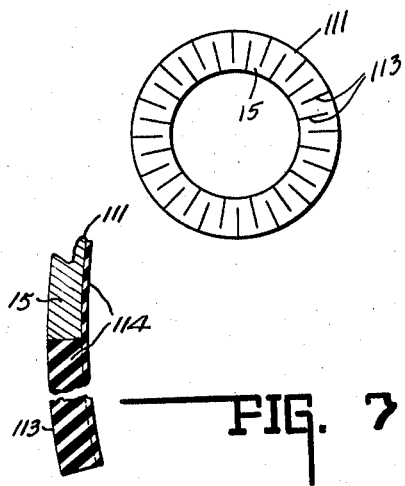
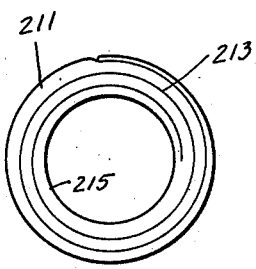
INVENTOR.
DUNN HAMILTON ROW.
BY
Lockwood Goldsmith & Galt
ATTORNEYS.

Patented May 17, 1938

2,117,770

UNITED STATES PATENT OFFICE 2,117,770

CONTACT GLASS CONSTRUCTION

Dunn Hamilton Row, Indianapolis, Ind.

Application May 29, 1936, Serial No. 82,505

4 Claims. (Cl. 88—54)

This invention relates to contact glasses adapted to be placed in close position to the cornea of the eye for eliminating irregularities in its refraction and serving certain conveniences and improving the appearance of the wearer over the ordinary spectacle lenses.

The usual type of modern contact glasses is a ground one piece structure comprising a spherical corneal portion providing the lens surrounded by a scleral rim adapted to contact directly with the eyeball and be held in position by the eye lids. Thus, the scleral rim rests upon and contacts with the sclera while the lens lies on top of the cornea separated from it by a fluid meniscus. The optical function of the glass is to maintain on the outer side of the cornea a fluid having a refractive index equal to that of the aqueous humour.

It is obvious that such a one piece contact glass must be carefully and perfectly fitted to avoid distress due to pressure on portions of the sclera resulting from failure to contact evenly about the entire scleral surface. It is, furthermore, difficult in commercial practice to provide a contact glass of both the proper curvature of the lens portion and the scleral rim, resulting in many different sizes and forms required to be provided and kept in stock in order to obtain the desired combination of curvatures.

It is the purpose of this invention to provide a contact glass of two parts which are interchangeable, one part being the lens or spherical corneal portion, while the other part comprises the peripheral scleral contact rim. By means of this arrangement, the scleral rim of the proper curvature may be combined with the lens of proper curvature.

However, the principal feature of the invention resides in forming the peripheral scleral rim of a flexible material and otherwise formed to permit it to flex when mounted upon the eyeball so as to conform to variations in curvature so that the contact pressure will be evenly distributed about the scleral rim and thereby avoid discomforting pressure at any one point. This is accomplished by slotting the scleral rim to permit portions thereof to flex with respect to other portions, the slots being radially disposed inwardly from the outer edge or otherwise, as may be desirable, and as will be hereinafter more fully set forth and described.

The full nature of the invention will be understood from the accompanying drawing and the following description and claims:

Fig. 1 is a plan view of the lens and rim. Fig. 2 is a diametrically-disposed section through the lens and rim showing it positioned over the eyeball diagrammatically illustrated. Fig. 3 is a plan view showing a portion of the scleral rim enlarged and exaggerated. Fig. 4 is a section on the line 4—4 of Fig. 1 considerably enlarged. Fig. 5 is a plan view of a modified form of the scleral rim. Fig. 6 is a plan view of a second modified form thereof. Fig. 7 is an enlarged section taken through one of the radial slots of Fig. 5.

In the drawing there is illustrated a contact glass comprising a spherical corneal portion 10, preferably formed of the usual crown optical glass suitably ground to the desired curvature. Said portion is generally of approximately 12 millimetres in diameter having a vertex thickness of 0.5 millimetre, and a depth of 2.5 to 4 millimetres. Surrounding the corneal portion there is a peripheral scleral rim 11 which is separately formed from the corneal portion or lens, and of a thin flexible and translucent material, such as a prepared cellulose substance or flexible glass. The rim is ordinarily of approximately 20 millimetres in diameter at the outer edge and approximately 12 millimetres in diameter at the inner edge, the material having a thickness of approximately 0.3 millimetre and formed to the curvature of the scleral portion of the eyeball.

Thus, by separately providing and forming the corneal or lens portion 10 and the scleral rim portion 11, various combinations of sizes and curvatures may be obtained, and it may be suggested that the radius of curvature of the inside surface of the lens portion may range from 5.5 millimetres up to 11 millimetres, while the radius of curvature of the inside surface of the scleral rim may range from 11 to 13 millimetres.

For providing flexibility to the scleral rim 11, it may be radially slotted to provide a series of radially extending fingers 12, separated from each other by the slots 13, so that their outer ends are free while their inner ends are joined. Thus, each flexible finger 12 may adjust itself to any irregularities in the sclera of the eyeball 14 and engage therewith under an equalized pressure throughout the entire contact surface. Inasmuch as the slots 13 terminate short of the inner edge of the rim, a solid portion 15 remains to which the lens 10 may be secured in any suitable manner. For this purpose, cement may be employed or a snap fit between the edge of the lens and a suitable groove formed about the inner periphery of the rim, as illustrated in Fig. 4. However, it is suggested that a tongue and groove connection between the lens and rim be provided supplanted by cement, as is well understood in the optical art.

As is well understood, in mounting the glass over the eye, it is the practice to moisten it with saline, apply it over the eyeball by pushing the upper portion of the rim 11 under the upper eyelid as the user looks down, and then as the user looks up the lower rim is pressed into the lower fornix, the eyelid being first drawn down and then allowed to spring back into position over the rim. It is important that the rim, and particularly the inner portion 15 thereof, provides a closed contact with the sclera so as to form a seal to prevent the escape of fluid from between the cornea and lens and prevent air bubbles entering therebetween.

In the modified form shown in Fig. 5, the radial slots 113 provided in the scleral rim 111, alternately extend inwardly from the outer periphery and outwardly from the inner periphery, terminating just short of the opposite peripheries, respectively, so that they are arranged in staggered relation. In this form of rim, however, in order to provide the desired seal surrounding the cornea and permit the proper mounting of the lens on the rim, it may be desirable to provide a filler 114 for the slots of resilient material, such as rubber or a synthetic composition. The use of such filler may be of value in maintaining a smooth unbroken surface over which the eyelids press by eliminating any danger of sharp edges or pinching of the bulbar conjunctiva resulting from exposed slots. Said filler may be provided in the form of a film covering the concave surface of the rim, or may be simply imbedded in said slots.

In the modified form shown in Fig. 6, flexibility of the rim 211 is obtained by extending a spiral slot 213 thereabout, said slot starting with the outer peripheral edge of the rim and terminating near the inner peripheral edge thereof, such portions of the rim defined by the slot being flexible relative to each other.

It is to be noted that the rim extends only partially to the "equator" of the eyeball so as not to interfere with the reflection of the bulbar conjunctiva onto the inner surface of the eyelids substantially forward of the "equator".

The invention claimed is:

1. A contact glass comprising a glass corneal lens substantially conforming in curvature to the cornea of the eyeball for positioning thereover, and a separately formed flexible scleral rim substantially conforming in its normal curvature to the sclera of the eyeball for mounting thereon, said lens and rim being secured to each other about their adjacent edges, the outer periphery of the rim terminating short of the "equator" of the eyeball and being slotted to provide relatively movable flexing portions for conforming to variations in curvature of the eyeball.

2. A contact glass comprising a glass corneal lens substantially conforming in curvature to the cornea of the eyeball for positioning thereover, and a separately formed flexible scleral rim substantially conforming in its normal curvature to the sclera of the eyeball for mounting thereon, said lens and rim being secured to each other about their adjacent edges, the outer periphery of the rim terminating short of the "equator" of the eyeball and being provided with a plurality of radial slots forming separate flexible portions movable relative to each other for conforming to variations in the curvature of the eyeball.

3. A contact glass comprising a glass corneal lens substantially conforming in curvature to the cornea of the eyeball for positioning thereover, and a separately formed flexible scleral rim substantially conforming in its normal curvature to the sclera of the eyeball for mounting thereon, said lens and rim being secured to each other about their adjacent edges, the outer periphery of the rim terminating short of the "equator" of the eyeball and being formed of a transparent cellulose material and slotted to provide relatively movable flexing portions conforming to variations in curvature of the eyeball.

4. A contact glass comprising a glass corneal lens substantially conforming in curvature to the cornea of the eyeball for positioning thereover, a separately formed flexible scleral rim substantially conforming in its normal curvature to the sclera of the eyeball for mounting thereon, said lens and rim being secured to each other about their adjacent edges, the outer periphery of the rim terminating short of the "equator" of the eyeball and being slotted to provide relatively movable flexing portions for conforming to variations in curvature of the eyeball, and a resilient protective filler covering said slots for providing said rim with a substantially unbroken surface.

DUNN HAMILTON ROW.